July 30, 1935. P. Q. WILLIAMS 2,009,721
VACUUM CUP LUGGAGE CARRIER
Filed May 26, 1934 2 Sheets-Sheet 1

Inventor
Percy Q. Williams
By Ernest F. Crampton
Attorney

July 30, 1935.  P. Q. WILLIAMS  2,009,721
VACUUM CUP LUGGAGE CARRIER
Filed May 26, 1934  2 Sheets-Sheet 2
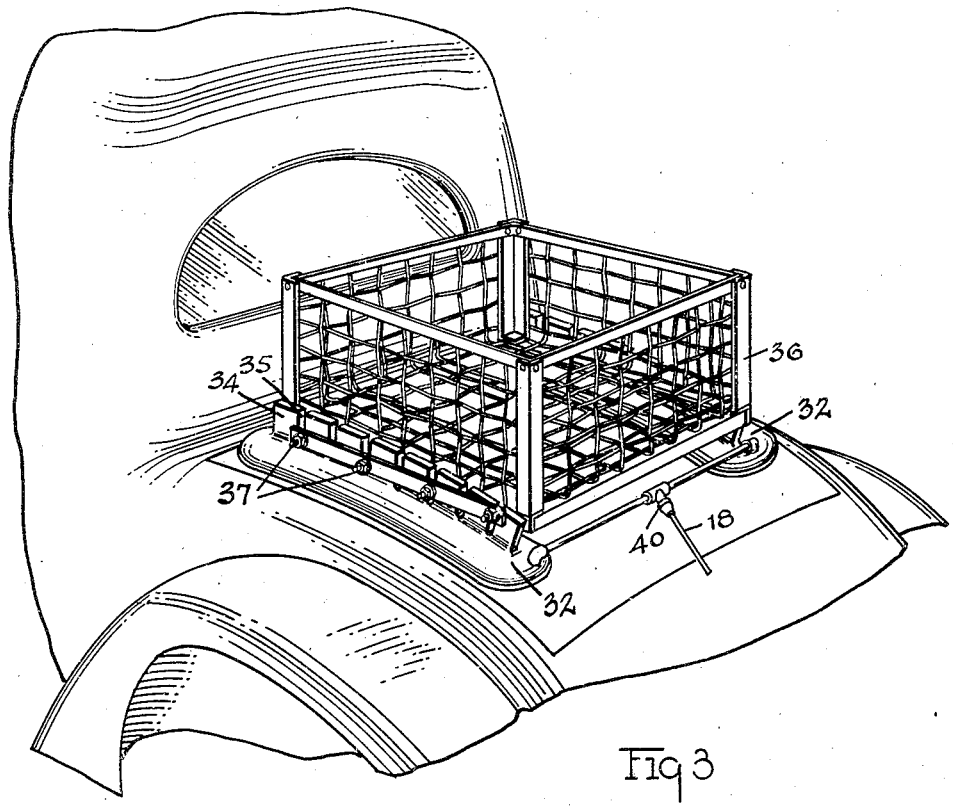
Fig 3
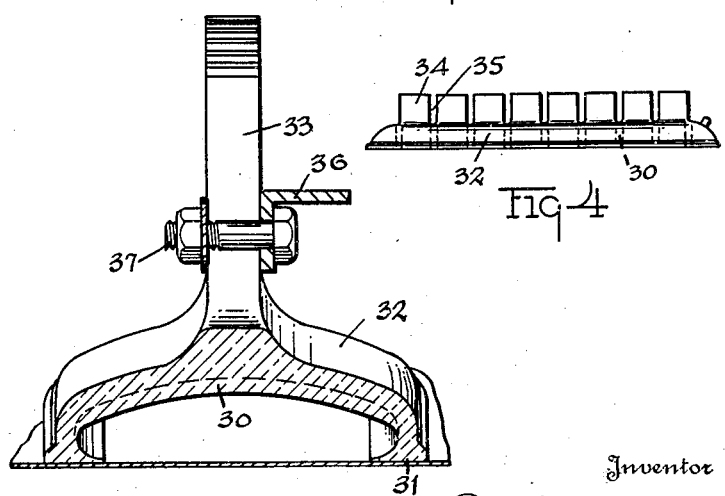
Fig 4
Fig 5
Inventor
Percy Q. Williams
By Faust F. Crampton
Attorney Patented July 30, 1935

2,009,721

UNITED STATES PATENT OFFICE 2,009,721

VACUUM CUP LUGGAGE CARRIER

Percy Q. Williams, Ottawa Hills, Ohio

Application May 26, 1934, Serial No. 727,640

4 Claims. (Cl. 224—29)

My invention has for its object to provide a luggage carrier secured in position by pneumatic pressure differential. The invention provides a means for creating a vacuous condition within an air sealed, chambered member closed by contact with a supporting object and formed to contain or hold articles. Thus, the invention finds its more ready application in connection with automobile luggage racks by reason of its ready adaptability to securement on curved or sloping polished or smooth surfaces commonly existing on automobile bodies, which enables the creation of a pressure differential.

In the particular adaptation for the specific use of supporting a rack for containing articles, a plurality of cups is disposed in spaced relation to form a broad base outline and thus insure marked stability and enable secure attachment of the vacuum cups to a plane surface or surfaces located in different planes or to a curved surface or to surfaces having different curvatures. In the adaptation of my invention it is preferably connected to a means for producing a vacuous condition, that is, a means for removing air from a substantially closed system, such as a pump or an internal combustion engine having connected thereto suitable one way valves for directing air to the engine as it draws its charges of air and gasolene during the intake or charging strokes in the cyclic operations of the pistons of the engine.

The invention may be used for different purposes and to that end may be contained in structures of different forms. To illustrate a practical application of the invention, I have selected a structure containing the invention and also a modified form thereof as examples of the different structures in which the invention may be embodied, it being understood that further modifications may be made without departing from the spirit of the invention. The particular structures selected as examples are shown in the accompanying drawings.

Figure 1:
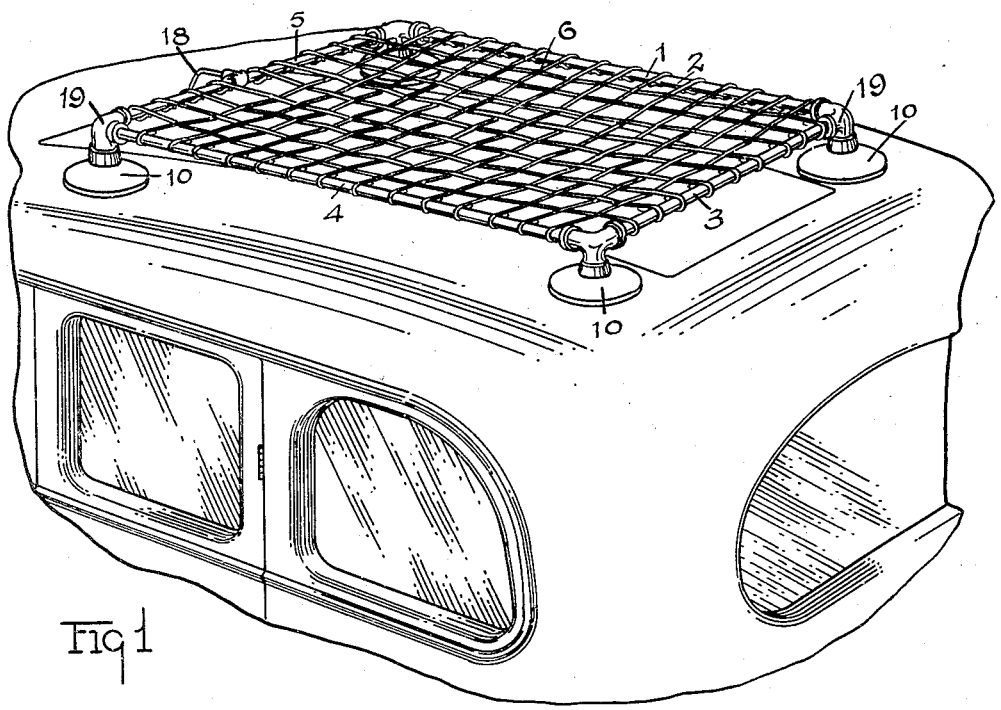
Figure 2:
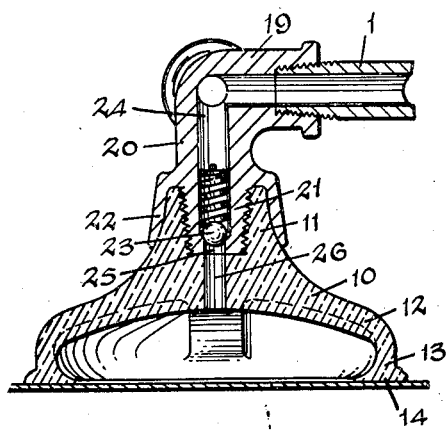

Fig. 1 illustrates a vacuum carrier supported on the top of an automobile body on which may be disposed articles, such as valises, bags, and implements, as may be desired. Fig. 2 illustrates a view of a section of a part of the vacuum cup used for attaching the carrier in position. Fig. 3 illustrates a modified form of the vacuum carrier shown in Figs. 1 and 2. Fig. 4 is a side view of the vacuum cup shown in Fig. 3 and particularly illustrates reinforcing ribs distributed in spaced relation throughout the length of the cup and which elastically coact to produce the retaining pressure differential. Fig. 5 is a view of a section of the vacuum cup illustrated in Fig. 3.

In the form of construction shown in Figs. 1 and 2, the carrier or rack 1 comprises four pipes 2, 3, 4, and 5 connected at their ends to form a rectangular-shaped frame and having webbing or netting 6 or other fabric stretched or extending between the pipes, which forms a relatively low hanging, flexible platform that operates to cause the articles therein to self-center with respect to the carrier when the carrier is supported in a substantially horizontal position.

A vacuum cup or sucker 10 is located in each corner of the carrier 1. The vacuum cups 10 are formed of elastic material, such as rubber, and each have a centrally protruding part 11 and a rib-reinforced, inverted, saucer-shaped part 12 provided with a peripheral edge portion 13 having a relatively wide air sealing surface 14 normally located in a plane substantially at right angles to the axis of the protruding part.

The protruding part 11 constitutes means whereby each vacuum cup or sucker 10 may be connected to the rack 1, while the resiliency of the saucer-shaped part 12 operates, when deformed centrally and inwardly and the peripheral part is placed in sealing contact with a surface, to reduce the interior air pressure and produce a marked pneumatic pressure differential that, by reason of the large total area covered by the saucer-shaped part, produces an exceedingly secure attachment of the carrier to the automobile in that it not only prevents slipping of the carrier over the supporting surface, but also resists, with a great pressure, an external force tending to move the rack away from the supporting surface.

The vacuous condition is maintained in the vacuum cups by reason of their connection through the pipes 2, 3, 4, and 5 to the pipe 18 that leads either to an air pump or to the intake manifold of the engine of the automobile. The pipes 2 to 5 are formed of piping having a relatively large diameter, forming thereby a large total volume. The pipe 18 thus constitutes a means for reducing the pressure, within the pipes 2, 3, 4, and 5, of the rack and the cups and the pipes 2 to 5 constitute an air evacuated reservoir of relatively large volume in immediate connection with the cups and operates to maintain a low pressure within the cups.

The pipes 2, 3, 4, and 5 are connected with elbows 19 that may be connected to or formed integrally with the pedestals 20 having threaded, tapered ends 21 surrounded by suitable flanges or skirts 22 which surround the protruding parts 11 of the vacuum cups 10. The protruding parts 11 are provided with threaded tapered sockets, while the flanges 22 fit the exterior surfaces of the protruding parts when the cups 10 are screwed into position with respect to the pedestals 20. Inasmuch as the protruding parts are provided with conical surfaces that fit the inner conical surfaces of the skirts, and the pedestals have tapered, threaded ends located within the skirts that fit the tapered, threaded sockets, the resilient vacuum cups will be securely connected to the pedestals 20 when they are rotated to cause the tapered ends 21 of the pedestals to be threaded into the conical sockets of the cups, since the conical surfaces of the protruding parts 11 are wedged against the conical interior surfaces of the pedestals 20.

A suitable valve, such as a ball 23 may be located in a central bore 24, formed in each pedestal 20 and seated on a seat formed by a reduced central bore 25 that extends to the lower end of the pedestal. The central part of the cup is provided with a passageway 26 that communicates with the bore of the pedestal and with the interior of the saucer-shaped part 12. Thus, not only will the weight of articles that may be placed on the rack assist in maintaining the rack in position, but the pressure differential that is created by the suction produced through the pipe 18 and the large area over which the differential pressure is exerted will operate to hold the rack securely in position.

In the form of construction illustrated in Figs. 3, 4, and 5 elongated cups 32 are used that are suitably ribbed by the ribs 30, which are disposed substantially in parallel relation over the interior surface of the elongated saucer-shape of the cup. The cup 32 also has a wide peripheral surface 31 formed along its edge to produce a broad sealing surface. The elongated cups 32 are provided with a protruding central flange 33. The flange may be divided into sections 34 by means of cuts 35, whereby the cups may be readily flexed to enable their sealing surfaces 31 to readily conform to a curved supporting surface, such as is commonly found on the parts of the automobile body. The carrier or rack 36 may be connected to the flange 33 by means of the bolts and nuts 37. The carrier 36 shown in Fig. 3 may be provided with suitable flexible sides and bottom and may be provided with suitable standards and corner parts to maintain its box form. Its position on the supporting surface is not only maintained by the weight of the carrier, but also by the suction which is created by the pipe 18, which is connected to the low air pressure producing means of the automobile and to the cups.

The pipe 18 may be branched as shown in Fig. 3, and a one way valve having the shell 40 may be located in the pipe to prevent return flow of air to the cups 32.

If it is desired, the flange sections of the cups may be reinforced with canvas to prevent abrasion by the clamping bolts and nuts 37. The reinforcing canvas will operate to increase the durability and resistance to wear of the construction.

I claim:

1. In a carrier, a frame comprising a plurality of tubular members, cups connected to the frame of the carrier and communicating with the interior of the members of the carrier, a support, a suction means connected to the tubular members of the carrier, means for preventing the return flow of air to the cups of the carrier and for maintaining a large differential pressure on the walls of the vacuum cups when the edges of the vacuum cups are placed in sealing relation to the surface of the support.

2. In a removable carrier, a frame comprising a plurality of connected, intercommunicating tubular members, a plurality of elastic vacuum cups connected at spaced points to the connected tubular members, a support, a suction means connected to the said cups through the said connected tubular members for producing a pressure differential on the surface of the cups for pneumatically securing the cups to the support.

3. In an automobile carrier, a tubular frame, elastic vacuum cups connected to corners of the frame, means for connecting the said frame to the intake manifold of the engine of the automobile for producing a pressure differential on the surfaces of the cups for pneumatically securing the cups to smooth surfaces of the automobile, a one-way valve located intermediate the frame and the intake manifold of the engine for preventing return gas flow to the cups.

4. In an automobile carrier, a frame comprising a plurality of connected intercommunicating tubular members having relatively large interior passageways and forming a relatively large low pressure air reservoir, the frame having tubular parts projecting from and communicating with the frame, a plurality of elastic vacuum cups connected to the projecting parts, the intake manifold of the engine connected to the frame for withdrawing air from the frame and the cups for producing a differential pressure attachment means to secure the carrier to the surface of the automobile when placed thereon, and a one-way valve for preventing return flow to the cups through the connection with the engine.

PERCY Q. WILLIAMS.